United States Patent [19]
Jantunen

[11] Patent Number: 5,704,716
[45] Date of Patent: Jan. 6, 1998

[54] ARRANGEMENT FOR MOUNTING SLIDES

[75] Inventor: Heikki Jantunen, Tampere, Finland

[73] Assignee: Tamrock Oy-(L.C.), Tampere, Finland

[21] Appl. No.: 605,040

[22] PCT Filed: Sep. 2, 1994

[86] PCT No.: PCT/FI94/00388

§ 371 Date: Mar. 28, 1996

§ 102(e) Date: Mar. 28, 1996

[87] PCT Pub. No.: WO95/06800

PCT Pub. Date: Mar. 9, 1995

[30] Foreign Application Priority Data

Sep. 3, 1993 [FI] Finland ................... 933866

[51] Int. Cl.⁶ ................... F16C 33/00
[52] U.S. Cl. ................... 384/41; 384/42
[58] Field of Search ................... 384/42, 41, 17, 384/7

[56] References Cited

U.S. PATENT DOCUMENTS

| 1,981,992 | 11/1934 | Curtis | 384/41 |
| 2,049,394 | 7/1936 | Johnson | 384/41 |
| 3,650,576 | 3/1972 | Hughes | 384/41 |
| 4,566,738 | 1/1986 | Fasth | 384/42 |
| 4,682,899 | 7/1987 | Andersson et al. | 384/41 |
| 4,925,320 | 5/1990 | Foster et al. | 384/42 |

FOREIGN PATENT DOCUMENTS

| 4118479 | 1/1992 | Germany | 384/42 |
| 403 814 | 9/1978 | Sweden. | |
| WO 94/07000 | 3/1994 | WIPO. | |

*Primary Examiner*—John M. Jillions
*Assistant Examiner*—Matthew A. Kaness
*Attorney, Agent, or Firm*—Nixon & Vanderhye P.C.

[57] ABSTRACT

Arrangement for mounting slides between a rock drilling machine and a carriage or the like mounted slideably with respect to the feeding beam of the drifting machine. In the arrangement, slide flames are formed by an integral body having a groove for a slide made as an integral body. The groove and the slide are such in cross section that the slide can be inserted into the slide frame only in its longitudinal direction.

6 Claims, 1 Drawing Sheet

ARRANGEMENT FOR MOUNTING SLIDES

BACKGROUND AND SUMMARY OF THE INVENTION

The invention relates to an arrangement for mounting slides between a feeding beam for a rock drilling machine and a slide means such as a carriage mounted longitudinally of the feeding beam, the arrangement comprising slide frames attachable to the slide means on both sides of the feeding beam, and slides fitted in the slide frames so as to be in contact with slide surfaces extending on both sides of the feeding beam in its longitudinal direction and at an angle with respect to each other.

A rock drilling machine moves along its feeding beam in a carriage, which today is mounted with respect to the feeding beam either slideably by utilizing slides of longitudinally movable by utilizing rollers of different kinds or other similar means. The travelling centralizer of the drill rod and the hose reel also move on similar structures.

A widely used structure utilizing various rollers is expensive to produce and difficult to mount and adjust. Rollers are liable to damage, as they are exposed to very high surface loads due to the line surface contact of the rollers. Such rollers also wear out easily, and they are difficult to adjust with the smallest possible clearances and in such a way that the drilling machine would be in a straight position with respect to the drilling axis. Furthermore, a structure is known in which slide frame halves made of separate form profiles are attached to the carriage, each half comprising strap-like slides of synthetic material that slide along the surface of the feeding beam. In this solution the clearances of the carriage are intended to be adjusted by oblique elongated holes. The solution is very complex and nevertheless difficult to adjust. Moreover, the structure is expensive to realize and requires plenty of different machining operations and fittings of great dimensional accuracy.

The object of the present invention is to provide an arrangement for mounting slides which is simple and easy to produce and easy to mount in position and needs no substantial adjustment during the use of the slides. The arrangement according to the invention is characterized in that the slide frame is an integral body provided with a groove to be positioned towards the feeding beam and intended for the slides, that the slide is an integral body insertable into the groove of the slide frame by pushing in its longitudinal direction, the slide having a groove to be positioned towards the feeding beam such that the slide is in contact with both of the slide surfaces provided in the feeding beam at an angle with respect to each other.

An essential feature of the invention is that the slide frames are preferably made of an aluminium alloy by extruding into a desired shape so that the slide frame has a groove intended to be positioned at the slide surfaces of the feeding beam. The groove extends longitudinally of the beam and enlarges in the direction towards the feeding beam, and a slide is to be positioned in the groove between the feeding beam and the carriage or the like. A further essential feature of the invention is that the slide is an integral body, which can be made e.g. by casting into a mould so that its one side fits tightly into the groove of the slide frame while the other side can be positioned accurately against two slide surfaces provided in the feeding beam at an angle with respect to each other. Still another essential feature of the invention is that the groove of the slide frame and the slide are such in cross-section that the slide can be inserted into the groove only in its longitudinal direction and that it is attached to the carriage preferably by transverse grooves formed in it or by mounting pins or bolts passing through holes, the slide frame being secured by the same pins or bolts.

The structure according to the invention is simple and easy to assemble, and no adjustment of clearance is required in normal use. The structure is resistant to wear and retains its direction during the use of one lot of slides without adjustment.

In the following the invention will be described more fully with reference to the attached drawings.

DETAILED DESCRIPTION OF THE DRAWINGS

Figure 1:
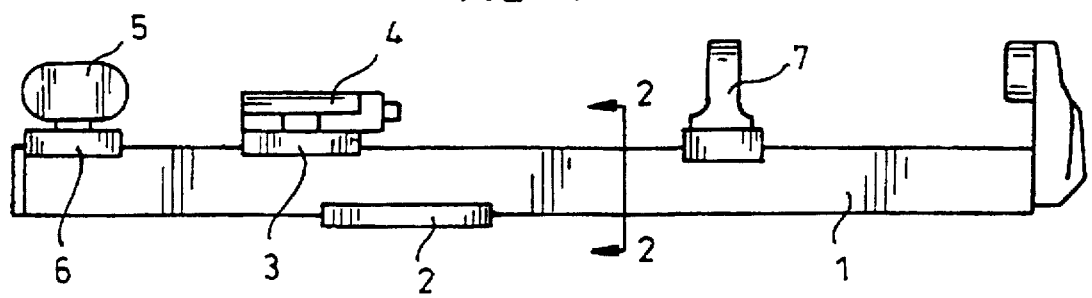
FIG. 1 is a schematic side view of a feeding beam with a carriage and a cradle for the feeding beam.

FIG. 1 is a Schematic side view of a feeding beam 1 for a rock drilling machine, the feeding beam being mounted longitudinally slideably in a cradle 2. A carriage 3 for the rock drilling machine is further arranged to slide longitudinally of the feeding beam 1 along its upper surface. Rock drilling machine 4 is attached to the carriage 3 to move along the feeding beam 1 when the carriage is moved in a known manner by a feeding device. Upon the feeding beam at its one end there is further provided a hose reel 5 and a carriage 6 for it. A travelling centralizer 7 is also arranged longitudinally movably on the feeding beam. As used in this patent application and claims, the term slide means refers to the cradle 2, the carriage 3 of the rock drilling machine, the carriage 6 of the hose reel, a part of the travelling centralizer 7 that moves along the feeding beam or any other device or component mounted to slide longitudinally of the feeding beam on the slide surfaces of the feeding beam.

Slide frames 8 are attached to the cradle 2 (FIG. 2), and in the same way (but not shown to), the carriage 3 of the rock drilling machine 4, the carriage 6 of the hose reel 5, and the travelling centralizer 7. Slides 9 shown in FIG. 2 are fitted in the slide frames 8 so that the rock drilling machine 4, the hose reel 5 and the travelling centralizer 7 slide along the slide surfaces of feeding beam 1 shown in FIG. 2 in the same way as the feeding beam 1 slides on its slide surfaces shown in FIG. 2 along the cradle 2.

Figure 2:
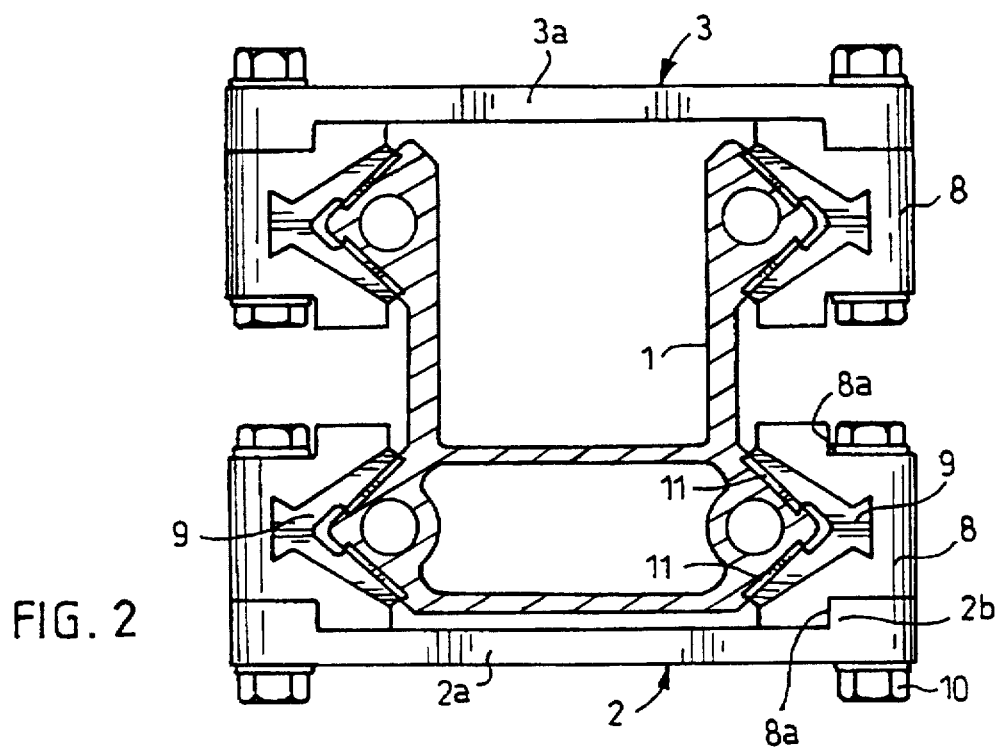
FIG. 2 shows a sectional view taken generally along section line 2—2 of FIG. 1, adding detail to the schematic shown in FIG. 1, but omitting the rock drilling component for simplicity.

FIG. 2 shows by way of example a cross-section through the feeding beam of the rock drilling machine, and illustrates the carriage of the rock drilling machine mounted to the feeding beam, and the cradle 2 positioned below the feeding beam 1. As appears from the figure, the cradle 2 and carriage 3 are substantially similar in structure, and so mainly the operation and structures between the cradle 2 and the feeding beam 1 only will be described below.

As appears from the figure, the cradle 2 is formed by a plate-like body 2a transverse to the feeding beam 1 and having shoulders 2b at the edges. Further, the slide frames 8 with slides 9 are attached to the body 2a of cradle 2 by means of bolts 10 extending through both the frames and the slides. The slide frame 8a correspondingly comprises a shoulder 8 of such dimensions that it matches with the shoulder 2b of the body 2a of cradle 2 so that the slide frame and the cradle bear against each other accurately and reliably by their shoulders 8a and 2b, and the slide frame 8 is thus always in a desired positioned with respect to the body 2a of the cradle. Slide frame 8 is provided with a groove enlarging towards the feeding beam 1, the narrower end of the groove having a dove-tail-shaped expansion. Slide 9 is fitted in the groove. The slide is an integral body made by casting from polyurethane, for instance, and it has the shape of the groove of slide frame 8, being thus insertable into the groove only in its longitudinal direction. Identical slides 9 on opposite sides of the feeding beam 1 bear against slide surfaces provided at an angle with respect to each other in slide rails 11 mounted on both sides of the feeding beam 1, and so the feeding beam 1 and cradle 2 can slide on them with respect to each other while maintaining their direction accurately. The slide rails 11, or slide surfaces formed in some other way on the feeding beam 1, are at an angle with respect to each other such that the slides of the cradle or carriage bear on the feeding beam 1 both in the vertical and transverse direction of it, and so the position of the cradle or carriage of the feeding beam remains accurately determined. The carriage 3 of the rock drilling machine is mounted in the same way with respect to feeding beam 1, and it has the same components and operations as mentioned in connection with cradle 2. Wearing of the slides 9 in the long run has been taken into account in the construction of the slides and slide frames 8. Slide frame 8 is symmetrical in cross-section, having shoulder 8a on its both sides, and so it can be turned the other way round when required. Slides 9 in turn can be changed by detaching bolts 10 and then pushing slide 9 off the frame 8 in its longitudinal direction. Slide 9 is locked immovable in its longitudinal direction by means of transverse notches shown more precisely in FIG. 3. Bolts 10 pass through the notches and prevent the slides 9 from moving. The solution according to the invention provides a slide structure which is easy to realize and easy to replace. The structure does not normally need to be adjusted, and it is always ready in its right position so that the feeding beam and a device or cradle mounted slideably with respect to it will always be in the right position and on the central line of the feeding beam. Due to the shoulders 2b and 8a, no incorrect installations or adjustments are possible.

Figure 3:
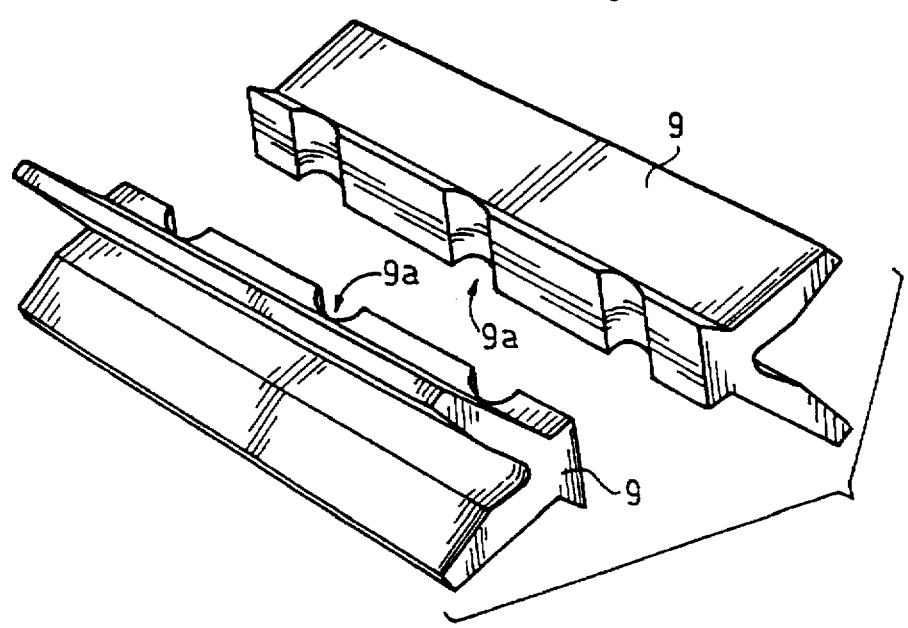
FIG. 3 is a schematic perspective view of a slide used in the arrangement according to the invention in two directions.

FIG. 3 is a perspective view of the slide 9 as seen in two directions. It appears from the figure how notches 9a are formed in the dovetail-shaped portion of slide 9. When the slide 9 has been inserted inside the slide frame, the notches are positioned, in this specific case, at three bolt holes made in the frame so that when the slide frame 8 is attached to the body 2a of cradle 2, bolts 10 pass through the holes and thus also through notches 9a.

The invention has been described above and shown in the drawings only by way of example, and it is not in any way restricted to the examples. Slides 9 may be of different cross-sections, provided that their outer surface is substantially equal in shape to the groove of slide frame 8 and, on the other hand, that they when mounted in position bear against slide surfaces provided in the feeding beam 1 or against slide rails attached to the beam, thus keeping the feeding beam 1 and cradle 2 or carriage 3, respectively, against each other with the smallest possible clearance and such that they move in parallel. This slide solution can be applied not only for mounting a slide means such as the cradle 2 or the carriage 3 of the rock drilling machine with respect to the feeding beam but also other required carriages or components intended to move longitudinally of the feeding beam. The slide frame may comprise a single integral slide substantially equal in length with the slide frame 8 or, if desired, two or more slides equal in cross-section. Essential is that each slide body is such in cross-section that it can be inserted between the slide frame and the feeding beam, keeping the slide means, such as a carriage, in its right position with the smallest possible clearance.

I claim:

1. In a rock drilling machine including a longitudinally arranged feeding beam, a mounting arrangement between the longitudinally arranged feeding beam and at least one component slidable along said feeding beam, the arrangement comprising a pair of opposed slide frames mounted to said component along opposite sides thereof, said opposed slide flames having mutually facing grooves formed therein, each groove having at least two adjacent surfaces oriented at a predetermined angle; a slide member secured within each of said grooves, each slide member having at least two exterior surfaces engaged with said at least two adjacent surfaces of a respective one of said grooves, each slide member and respective one of said grooves also having cooperating attachment surfaces which expand in a direction away from said feeding beam such that said slide members are insertable within said slide frames only in a longitudinal direction of the feeding beam; wherein said feeding beam is provided with angled slide surfaces along opposite side edges thereof, and wherein said slide members each have a groove facing said feeding beam and in surface engagement with said angled slide surfaces along the opposite side edges of said feeding beam.

2. The arrangement according to claim 1, wherein each slide frame is attached to the component by bolts extending in a transverse direction relative to the feeding beam, mounting holes for the bolts extending at least partly through the groove of the slide frame, and wherein the slide members have notches at the mounting holes of the bolts in parallel therewith such that the slide members are fixed immovable with respect to the slide frame when the mounting bolts are in position.

3. The arrangement according to claim 2, wherein the slide frames and the slide members are symmetrical in cross-section.

4. The arrangement according to claim 2, wherein the slide members are substantially equal in length to the slide frames.

5. The arrangement according to claim 1, wherein the slide frames and the slide members are symmetrical in cross-section.

6. The arrangement according to claim 1, wherein the slide members are substantially equal in length to the slide frames.

* * * * *